Oct. 26, 1965  J. L. BAUMAN ETAL  3,214,190
IMPLEMENT HITCH

Filed Nov. 13, 1962  3 Sheets-Sheet 1

Inventors
Jack L. Bauman
Charles Boetto
Attorney

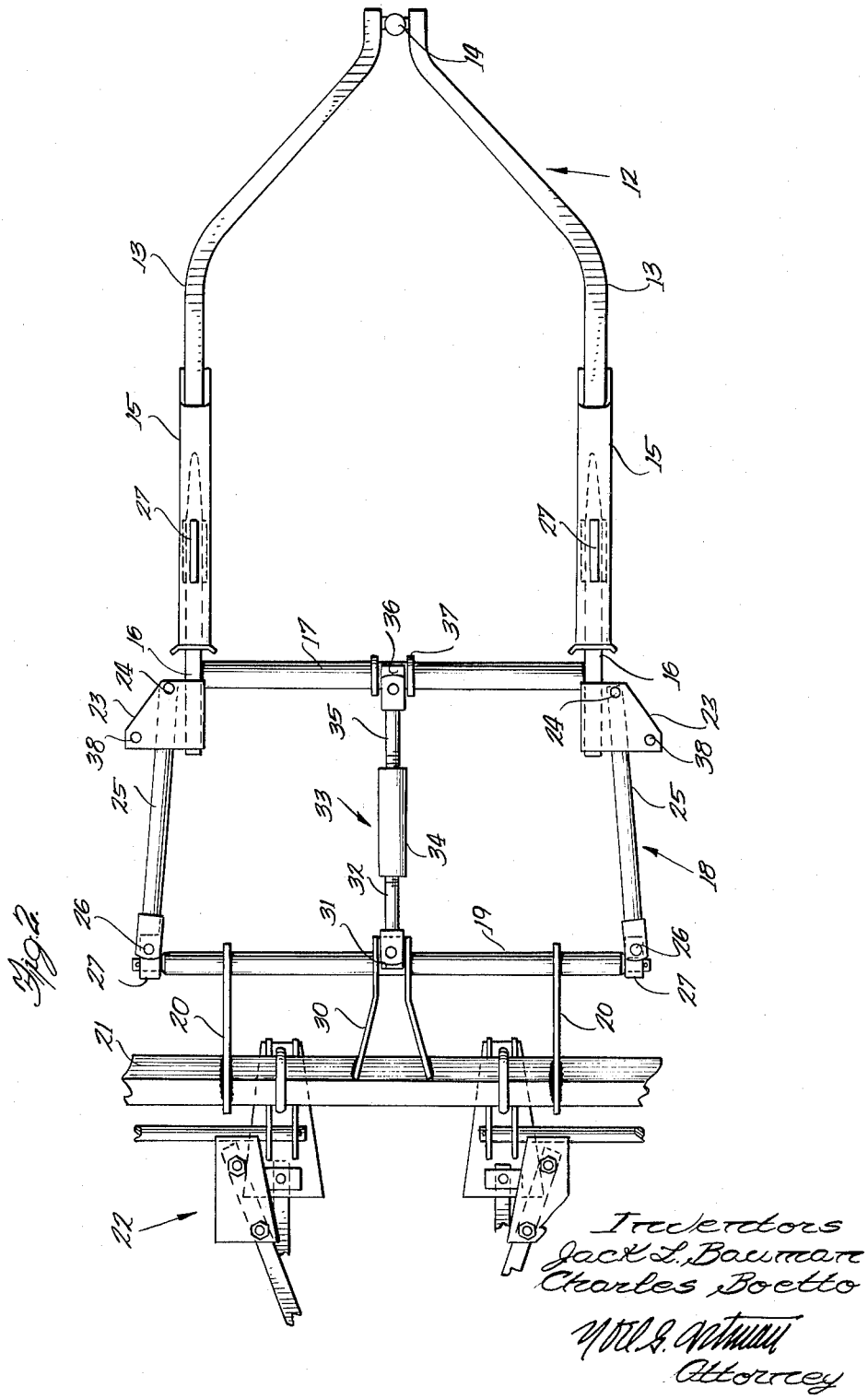

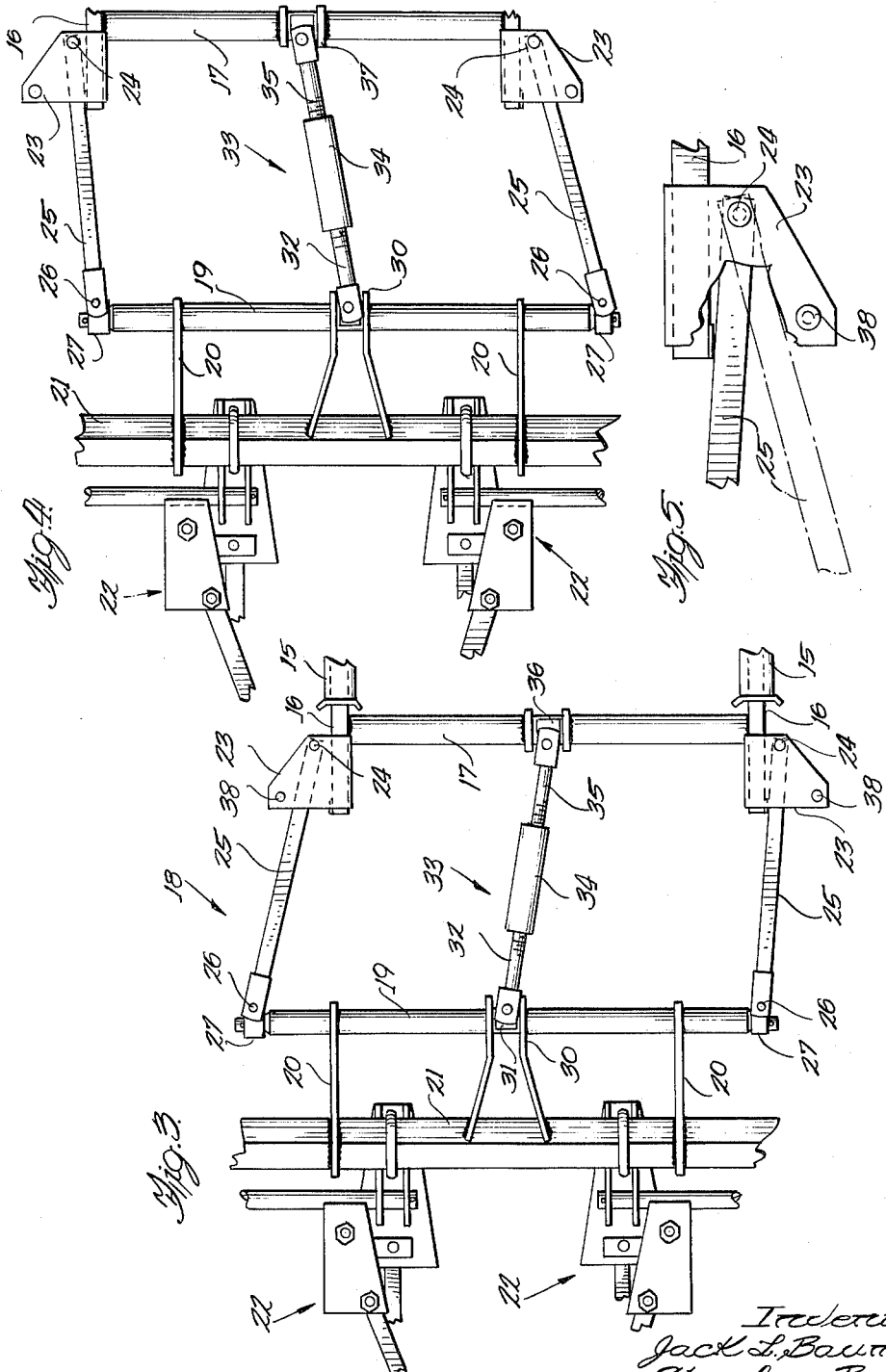

United States Patent Office 3,214,190
Patented Oct. 26, 1965

3,214,190
IMPLEMENT HITCH
Jack L. Bauman and Charles Boetto, Naperville, Ill., assignors to International Harvester Company, Chicago, Ill., a corporation of New Jersey
Filed Nov. 13, 1962, Ser. No. 236,898
5 Claims. (Cl. 280—447)

This invention relates to agricultural implements and particularly to an implement of the tractor-mounted or direct-connected type. More specifically, the invention concerns novel hitch means for connecting an implement to a tractor.

The invention is described herein in its application to an implement of the lister cultivator type, which is a transversely elongated implement having earthworking tools adapted to operate in the hollows between relatively high beds upon which the tractor wheels are driven. It has been found that when an implement of this type is mounted on a tractor by conventional mechanism such as the well known two-point hitch, for example, the draft connection is so short that the cultivator does not track properly and slight lateral shifting of the position of the tractor wheels with respect to the beds is transmitted to the implement so that its stability is seriously impaired.

Therefore, an object of this invention is the provision of a novel tractor-implement combination wherein the stability of the implement with respect to the tractor is greatly improved.

Another object of the invention is the provision of novel hitch means for connecting an implement to a tractor wherein the operating advantages of an implement of the trail-behind type are combined with the control and transport advantages of a direct-connected or mounted implement.

Another object of the invention is the provision of novel flexible hitch means for connecting an implement to a tractor to be carried thereby in transport, wherein improved lateral flexibility of the implement relative to the tractor is achieved to stabilize the implement in operation.

Other objects and advantages of the invention will become clear from the following detailed description when read in conjunction with the accompanying drawings, wherein:

FIGURE 2 is a plan view of a portion of the implement shown in FIGURE 1 and the hitching apparatus by which it is connected to a tractor;

FIGURE 3 is a plan view of a portion of the tractor shown in FIGURE 2 showing one position of the implement frame with respect to the hitch mechanism;

FIGURE 4 is a view similar to FIGURE 3 showing another position of the implement relative to the hitch apparatus, and FIGURE 5 is an enlarged detail of a portion of the hitching apparatus.

Figure 1:
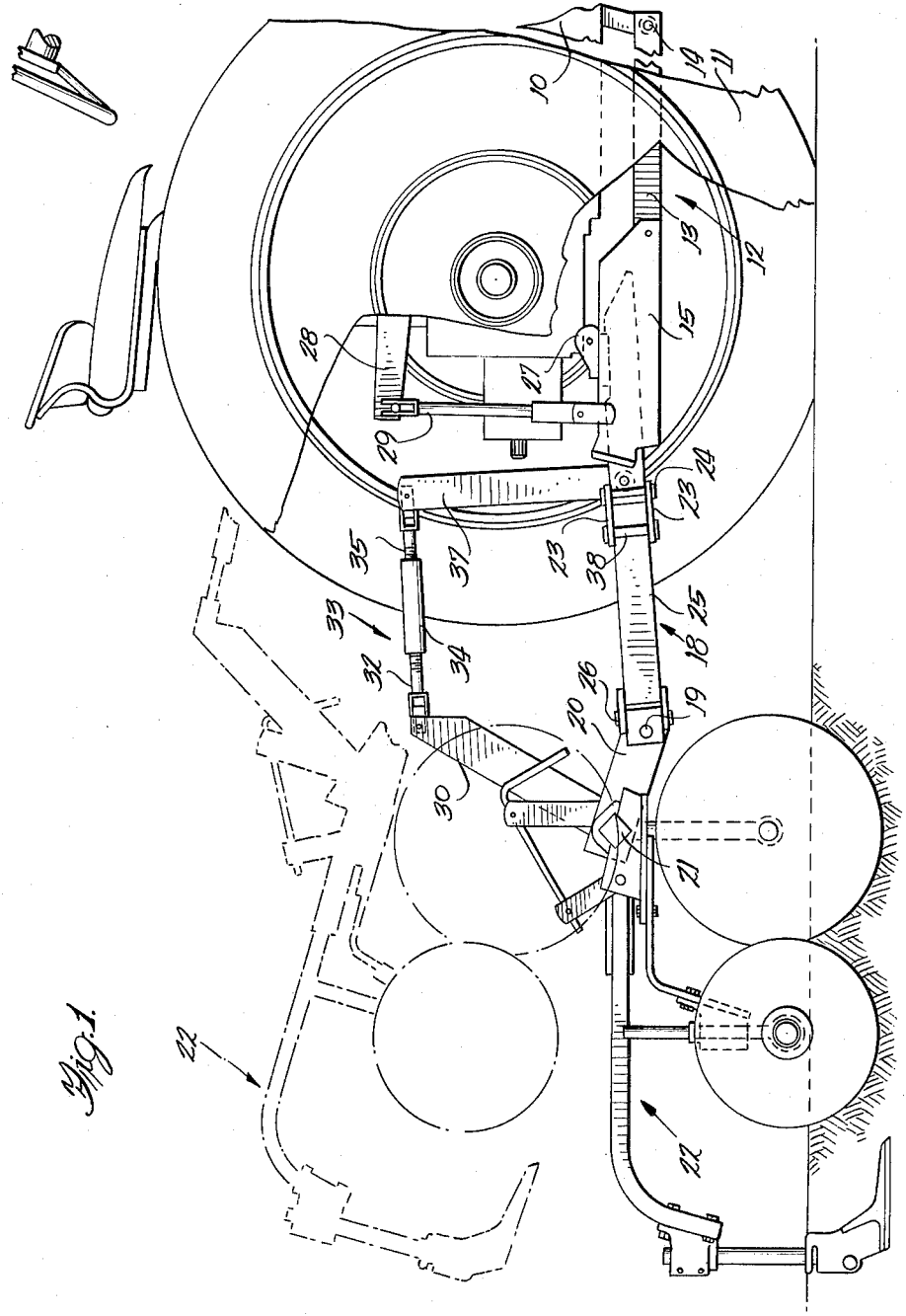
FIGURE 1 is a view in side elevation of the rear end of a tractor having an implement connected thereto by hitch mechanism incorporating the features of this invention.

In FIGURE 1 of the drawings the tractor is shown to have a body 10 and laterally spaced rear drive wheels 11. A tractor draft structure in the form of a drawbar 12 comprises laterally spaced bars 13 the forward ends of which converge and are provided with a universal joint connection 14 to the body of the tractor to accommodate both lateral and vertical swinging about the axis of pivot 14. To the rear ends of arms 13 are secured elongated tubular socket members 15 in which are slidably received laterally spaced elongated prongs 16 connected by a transverse brace 17.

An implement draft structure 18 includes a transversely extending shaft 19 rockably mounted in brackets 20 affixed to and projecting forwardly from a transversely extending implement frame bar 21 on which cultivator units 22 are mounted at laterally spaced locations.

A pair of vertically spaced plates 23 are affixed to and project laterally outwardly from the rear ends of prongs 16. Each pair of plates carries a vertical pivot pin 24 which is received in a sleeve formed at the forward ends of each of a pair of laterally spaced generally parallel links 25, the rear ends of which diverge somewhat and are pivotally connected by a vertical pin 26 to swivels 27 pivotally mounted on the reduced ends of shaft 19. Prongs 16 are held against longitudinal displacement from sockets 15 by latch means indicated at 27. This means that, even should the tractor wheels slip off the high beds toward the adjacent furrows, causing the close-coupled draw-bar 12 to move laterally with the tractor in the same direction, the pivotal connection of the implement draft structure 18 accommodates lateral swinging movement therebetween and the draw-bar 12 in a direction away from that to which the tractor and the draw-bar have moved and thus allow the cultivator units 22 to remain in their proper operating position in the furrow.

By virtue of the articulated tractor-implement attaching structure shown in the drawings, it should be clear that the frame bar 21 with the earthworking units 22 mounted thereon is capable of following in the path of the tractor during operation. Not only can the draft structure 12 swing laterally with respect to the tractor but so can the implement hitch structure 18 and in a direction opposite to that of the draft structure 12. However, the implement shown in the drawings is a direct-connected or tractor-mounted implement adapted to be transported entirely upon the tractor. For this purpose the tractor is equipped with power lift mechanism including laterally spaced lift arms 28, only one of which is shown, connected by lifting links 29 to the socket members 15. Actuation of the tractor power means to rock arms 28 in a clockwise direction as viewed in FIGURE 1 raises the drawbar 12 to a position corresponding to the transport position of the implement.

In order to adjust the angle of penetration of the earthworking units 22 and to control the movement of the tool carrying frame 21 about the axis of shaft 19, a forwardly angled upright member 30 is affixed to the bar 21 and carries at its upper end a swivel 31 to which is pivotally connected a threaded rod 32 forming part of a turnbuckle 33. The threaded end of rod 32 is received in a threaded sleeve 34, the other end of which is threaded to receive the threaded end of another rod 35 the other end of which is pivotally connected to a swivel 36 mounted between the spaced parts of another upright member 37, the lower end of which is affixed to the transverse brace 17. Turnbuckle 33 adjusts the tool carrying frame 21 and holds the implement together as a stable unit with the hitch structure 18 and drawbar 12 so that, upon operation of the lift arm 28 of the tractor the implement is raised to the dotted line position indicated in FIGURE 1.

Lateral swinging of links 25 relative to the drawbar 12 is limited by engagement of the forward ends of the links with the rear ends of prongs 16 and with pins 38 extending between plates 23.

In operation, and to follow accurately the movement of the tractor, drawbar 12 swings laterally when the tractor is turned and links 25 assume positions as indicated in FIGURES 3 and 4 relative to the drawbar.

It is believed that the construction and operation of the novel implement attaching apparatus of this invention will be clearly understood from the foregoing description. It should likewise be understood that the invention has

What is claimed is:

1. In hitching apparatus for the connection of an implement having a frame to a tractor having power lift mechanism for raising the implement to a position to be transported by the tractor, a rigid tractor drawbar having its forward end pivotally connected to the tractor for vertical and lateral swinging movement and having its rear end connected to said power lift mechanism for vertically swinging the drawbar relative to the tractor between positions corresponding to operating and transport positions of the implement, and laterally spaced links pivotally connected at their forward ends to the drawbar and at their rear ends to the implement frame for lateral swinging of the links relative to the drawbar and to the implement to accommodate lateral swinging of said implement in a direction opposite to the direction of lateral swinging of said drawbar.

2. In hitching apparatus for the connection of an implement having a frame to a tractor having power lift mechanism for raising the implement to a position to be transported by the tractor, a rigid tractor drawbar having its forward end pivotally connected to the tractor for vertical and lateral swinging movement and having its rear end connected to said power lift mechanism for vertically swinging the drawbar relative to the tractor between positions corresponding to operating and transport positions of the implement, laterally spaced links pivotally connected at their forward ends to the drawbar and at their rear ends to the implement frame for lateral swinging of the links relative to the drawbar and to the implement, said drawbar being swingable laterally in one direction while said links and said implement are laterally swingable in the other direction, and independent means operatively connecting the drawbar and the implement effective to prevent relative vertical swinging movement therebetween while accommodating said lateral swinging of the implement relative to the drawbar.

3. The invention set forth in claim 1, wherein said laterally spaced links are the lower links of a three-point hitch system including upright members affixed to the tractor drawbar and to the implement frame and an upper link disposed between and above said lower links and connected at its ends to said upright members.

4. The invention set forth in claim 3 wherein said upper link is adjustable and the connection of the rear ends of said links to the implement frame includes horizontal pivot means accommodating pivotal movement of the implement relative to said links about a transverse axis.

5. In a tractor-implement combination wherein lift means are provided on the tractor for vertically moving the implement relative to the tractor between operating and transport positions, an articulated hitch structure comprising, a tractor draft structure pivotally connected at its forward end to the tractor for lateral and vertical swinging movement relative thereto, an implement hitch structure including laterally spaced links pivotally connected at their forward ends to the tractor draft structure and at their rear ends to the implement for lateral swinging relative thereto, said draft structure being laterally swingable in one direction while said links and said implement are swingable in the opposite direction, and means in the connection of the implement hitch structure to the tractor draft structure for preventing relative vertical swinging movement therebetween.

References Cited by the Examiner

UNITED STATES PATENTS

| 2,583,897 | 1/52 | Smeds | 172—450 X |
| 2,596,579 | 5/52 | McKay | 172—450 X |
| 2,765,723 | 10/56 | Clarke et al. | 280—461 |
| 2,947,367 | 8/60 | Orelind et al. | 172—439 |

FOREIGN PATENTS

| 808,218 | 1/59 | Great Britain. |

A. HARRY LEVY, *Primary Examiner.*